US012776675B2

(12) United States Patent
Koch

(10) Patent No.: US 12,776,675 B2
(45) Date of Patent: Oct. 27, 2026

(54) ROTOR FOR AN EXTERNAL ROTOR MOTOR

(71) Applicant: BorgWarner Inc., Auburn Hills, MI (US)

(72) Inventor: Silvio Koch, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 200 days.

(21) Appl. No.: 18/750,197

(22) Filed: Jun. 21, 2024

(65) Prior Publication Data

US 2025/0030288 A1 Jan. 23, 2025

(30) Foreign Application Priority Data

Jul. 21, 2023 (DE) ......................... 102023119294.9

(51) Int. Cl.
*H02K 1/2791* (2022.01)

(52) U.S. Cl.
CPC .................................. *H02K 1/2791* (2022.01)

(58) Field of Classification Search
CPC ......... H02K 1/2791; H02K 1/278; H02K 1/30
See application file for complete search history.

(56) References Cited

U.S. PATENT DOCUMENTS 3,590,208 A * 6/1971 Martini .................. B21D 28/22 29/598
2005/0116557 A1 * 6/2005 Rojo Lulic ............. F16C 35/06 310/90
2017/0040856 A1 * 2/2017 Latulipe ............... H02K 1/2791
2018/0372107 A1 12/2018 Moser et al.
2022/0337106 A1 * 10/2022 Schwenk ................ H02K 1/30

FOREIGN PATENT DOCUMENTS

DE 102018114998 A1 12/2018

* cited by examiner

*Primary Examiner* — Tulsidas C Patel
*Assistant Examiner* — Mohammed Ahmed Qureshi
(74) *Attorney, Agent, or Firm* — Reising Ethington P.C.

(57) ABSTRACT

A rotor for an external rotor motor is described, having a stack of ferromagnetic steel sheets, permanent magnets which are fastened to an inner side of the stack, and a carrier which has a hub for a shaft and is fastened to the stack. It is provided that the carrier is connected to the stack by a shaft-hub connection.

12 Claims, 1 Drawing Sheet

ROTOR FOR AN EXTERNAL ROTOR MOTOR

CROSS REFERENCE TO RELATED APPLICATIONS

This application claims the priority to German Patent Application No. DE102023119294.9 filed on Jul. 21, 2023, and the entire content of this priority application is incorporated herein by reference in its entirety.

TECHNICAL FIELD

The present disclosure is related to a rotor for an electric motor with the features specified in the preamble term of claim 1.

BACKGROUND

In such a rotor for an external rotor motor, a stack of laminated sheets, which forms a short-circuit ring, must be connected to a carrier, which has a hub for a shaft. The task of the present disclosure is to show a way in which this can be done cost-effectively while ensuring reliable torque transmission from the stack of laminated sheets to the carrier.

This task is solved by a rotor with the features mentioned in claim 1. Advantageous further embodiments of the disclosure are the subject of subclaims.

SUMMARY

According to the disclosure, the stack of laminated sheets can be connected to the carrier by means of a shaft-hub connection. The ferromagnetic steel sheets may be made of electrical steel, i.e. soft magnetic steel such as silicon steel.

An advantageous further development of the disclosure provides that the metal sheets forming the stack of the short-circuit ring are welded together. In this way, although the short-circuit ring may consist of individual sheets, it is pre-assembled to form an assembly that is easy to handle. However, the sheets can also be joined together in other ways, for example by stamping or with an interlock system. The individual sheets of the sheet stack can be ring-shaped sheets or each form only one ring segment.

A further advantageous further development of the disclosure provides that the sheets of the stack are connected by several weld seams which extend in the axial direction and may be arranged on the outside of the stack of laminated sheets. The magnetic properties of steel sheets are generally impaired by welding. In the area of the weld seam where the material has been melted, the microstructure is typically adversely altered. It is therefore advantageous if the volume of the weld seams in the sheet stack is relatively small so that the magnetic properties of the sheet stack are only slightly impaired. For example, the weld seams can be provided in protrusions on the outside of the stack of laminated sheets, which may be completely in protrusions on the outside of the stack of laminated sheets. Such protrusions can extend in an axial direction on the outside of the stack of laminated sheets and contribute to the shaft-hub connection of the stack of laminated sheets to the carrier.

A further advantageous further development of the disclosure provides that the shaft-hub connection of the stack of laminated sheets to the carrier is secured by means of protrusions of the stack of laminated sheets, which extend on an outer side of the stack of laminated sheets in the axial direction and engage in slots of the carrier.

A further advantageous further development of the disclosure provides that the carrier carries a plurality of holders on its outer side, which connect the stack of laminated sheets to the carrier. The holders can engage at one end around the stack of laminated sheets and at their other end around an edge of the carrier, thus preventing axial movement of the stack of laminated sheets relative to the carrier. The holders can, for example, be arranged on protrusions of the stack of laminated sheets that extend in an axial direction. The brackets can be welded to the stack of laminated sheets. This has the advantage of increasing the stability of the rotor.

A further advantageous further development of the disclosure provides that the carrier may surround the stack of laminated sheets only over part of the axial length of the stack of laminated sheets. Since the steel sheets of the stack are welded to each other, it is sufficient for the transmission of torque from the stack of laminated sheets to the carrier if the shaft-hub connection is made over part of the axial length of the stack of laminated sheets. This has the advantage of reducing the mass of the rotor and thus improving the efficiency of the motor. Good results can be achieved, for example, if the carrier surrounds the stack of laminated sheets over 20% to 50% of the length of the stack of laminated sheets.

A further advantageous further development of the disclosure provides that the carrier has pairs of protrusions extending in the axial direction on the outside of the sheet stack, between which the slots are formed. In this way, the mass of the rotor can be advantageously reduced, thereby increasing the efficiency of the motor. The protrusions may have an elevation at their edge facing the slot, i.e. they extend further in the radial direction at this edge, which advantageously improves the mechanical stability for torque transmission from the stack to the carrier.

The number and width of the pairs of protrusions can be freely selected within wide limits. For example, a reliable shaft-hub connection can be realized with a carrier having 3 to 6 pairs of protrusions. In one embodiment, the distance between adjacent pairs of protrusions is at least twice as large as the slot width and can, for example, be five to ten times the slot width. In this way, the mass of the carrier can be advantageously kept low and a reliable shaft-hub connection between carrier and sheet stack can nevertheless be realized.

A further advantageous further development of the disclosure provides for the sheet stack to have grooves on its inner side which extend in an axial direction and in which the permanent magnets are arranged. The permanent magnets can thus advantageously stabilize the stack of laminated sheets. The permanent magnets can be glued into the grooves, for example. Protrusions on the outside of the stack of laminated sheets can, for example, be arranged opposite the grooves and thus compensate for the locally reduced radial thickness of the stack of laminated sheets due to the groove. However, it is not necessary for each groove to have a protrusion opposite it.

BRIEF DESCRIPTION OF THE DRAWINGS

Further details and advantages of the disclosure are explained with reference to the attached drawings.

DETAILED DESCRIPTION

Figure 1:
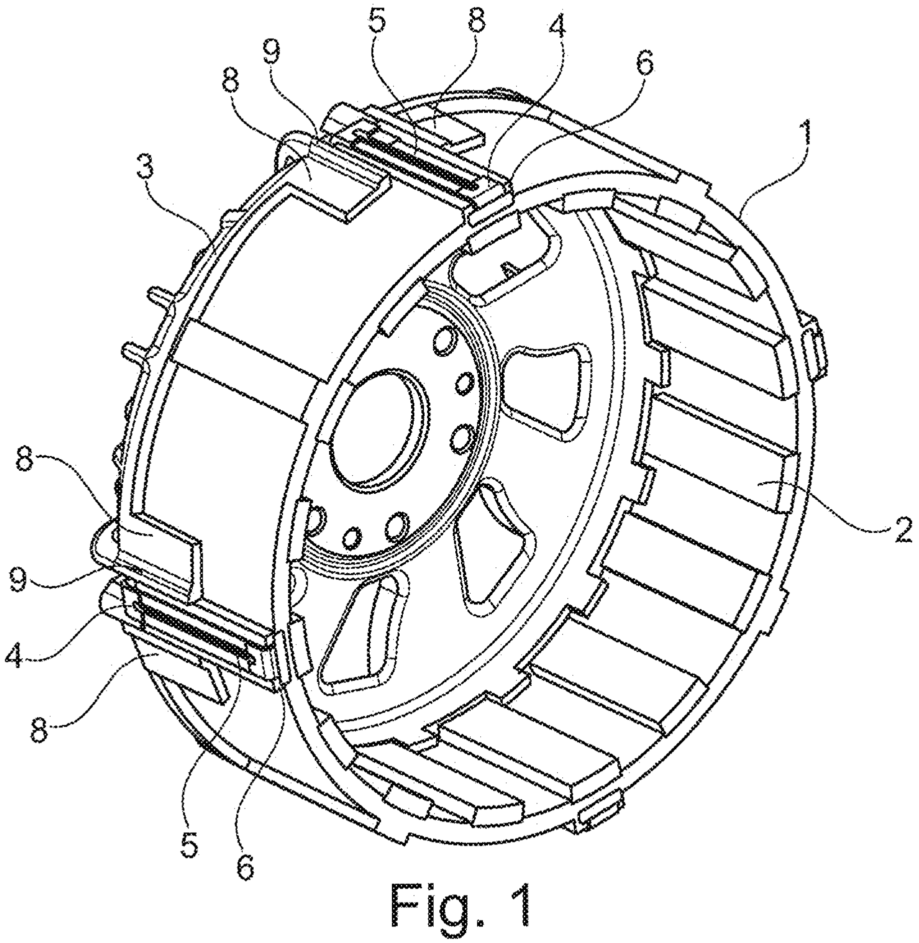
FIG. 1 illustrates a rotor for an external rotor motor.

The rotor shown in FIG. 1 has a stack 1 made of ferromagnetic steel sheets, permanent magnets 2 attached to an inner side of the stack 1 and a carrier 3 made of non-ferromagnetic material attached to the stack 1, which has a hub for a shaft not shown. The carrier 3 can be made of aluminum or an aluminum-based alloy, for example. The steel sheets of the stack 1 are formed by an electrobeam, i.e. soft magnetic steel, for example silicon steel, and are stacked on top of each other in the axial direction. The sheet plane of the individual sheets therefore extends perpendicular to the axial direction.

The stack 1 has brackets 4 on its outside, which may surround both ends and also the carrier 3. These brackets 4 can be welded to the stack. In the example shown, weld seams (not shown) run through the stack of laminated sheets, connecting all the individual sheets of the short-circuit ring 1 together. However, the sheets of the stack of laminated sheets can also be mechanically connected to each other in other ways, for example by an interlock system or by means of punching packets.

In the example shown, the stack 1 has four brackets 4 and the sheets of the stack 1 are welded together by four weld seams 5. The number of brackets 4 and weld seams 5 can be varied. Good results are generally achieved with three to six brackets 4 and weld seams 5. More brackets increase the manufacturing effort; fewer brackets make the stack 1 more difficult to handle.

In the embodiment example shown, the brackets 4 are arranged on protrusions 6 of the stack 1, which extend in an axial direction on the outside of the stack of laminated sheets. Advantageously, the magnetic properties of the sheets are thus only impaired to a negligible extent by the welding, which may be if the weld seams 5 only extend inside the stack 1 in the protrusions 6.

Figure 2:
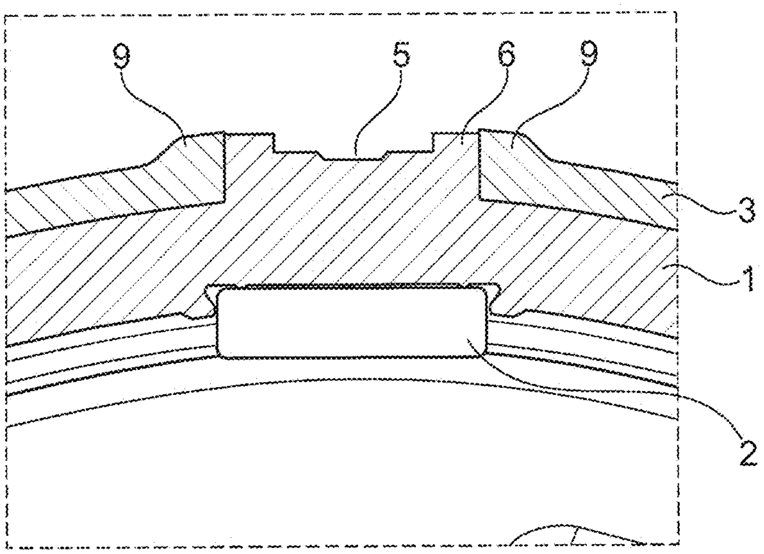
FIG. 2 shows a schematic representation of the shaft-hub connection between the sheet stack and the carrier.

The protrusions 6 on the outside of the stack 1 are also used for a shaft-hub connection between the stack 1 and the carrier 3. This shaft-hub connection is illustrated in FIG. 2. FIG. 2 shows a schematic sectional view of a detail of the stack 1 together with the rotor carrier 3. The protrusions 6 of the short-circuit ring 1, which are shown without brackets in FIG. 2 for simplification, engage in slots of the carrier 3 and thus enable torque to be transmitted from the stack 1 to the carrier 3. The slots of the carrier 3 are formed between protrusions 8 of the carrier 3, which extend in an axial direction on the outside of the stack 1. The slots are thus formed by pairs of protrusions 8 of the carrier 3, which can be seen in FIG. 1.

The protrusions 8 of the carrier 3 only extend over part of the axial length of the stack 1, for example over 20% to 50% of the axial length of the stack 1. In this way, a corrugated hub connection between the stack 1 and the carrier 3 can be realized with low material costs and advantageously low weight.

The protrusions 8 of the carrier 3 have an elevation 9 on their edge adjacent to the protrusions of the stack, i.e. they extend further in a radial direction on this edge. The elevations 9 are a thickening of the protrusions 8 and increase the mechanical stability for torque transmission.

There is a considerable distance between adjacent pairs of protrusions 8 of the carrier 3 to save material. In the example shown, the distance is more than twice as large as the slot width and is five to ten times the slot width.

As FIG. 2 shows, one of the permanent magnets 2 is arranged opposite each of the protrusions 6 of the stack 1. The permanent magnets 2 are glued into grooves in the inside of the stack 1. However, a protrusion of the stack 1 does not face each of the permanent magnets 2. As FIG. 1 shows, there are more permanent magnets 2 than protrusions 6 of the stack 1.

The invention claimed is:

1. A rotor for an external rotor motor, comprising:

a stack of ferromagnetic steel sheets including brackets on a radial outer side of the stack, permanent magnets fixed to an inner side of the stack, and a carrier which has a hub for a shaft and is attached to the stack, wherein the carrier is connected to the stack by protrusions on the stack that engage the brackets.

2. The rotor according to claim 1, wherein the metal sheets of the stack are welded together.

3. The rotor according to claim 2, wherein the plates of the stack are welded together by a plurality of weld seams extending in the axial direction on the outside of the stack.

4. The rotor according to claim 1, wherein the stack has protrusions on an outer side of the stack, which extend in an axial direction and engage in slots in the carrier.

5. The rotor according to claim 3, wherein the plurality of weld seams run in the protrusions.

6. The rotor according to claim 1, wherein the carrier surrounds the stack only over part of the axial length of the stack.

7. The rotor according to claim 6, wherein the carrier surrounds the stack over 20% to 50% of the length of the stack.

8. The rotor according to claim 4, wherein the carrier comprises pairs of protrusions extending in axial directions on the outside of the stack, between which the slots are formed.

9. The rotor according to claim 8, wherein the distance between adjacent pairs of protrusions of the carrier is at least twice as large as the slot width, preferably five to ten times the slot width.

10. The rotor according to claim 8, wherein the protrusions of the carrier have an elevation on their edge facing the slot.

11. The rotor according to one of claim 3, wherein one of the permanent magnets is arranged opposite each of protrusions of the stack.

12. The rotor according to claim 1, wherein a protrusion of the stack is located opposite only every second of the permanent magnets on the outside of the stack.

* * * * *